Patented Apr. 3, 1934

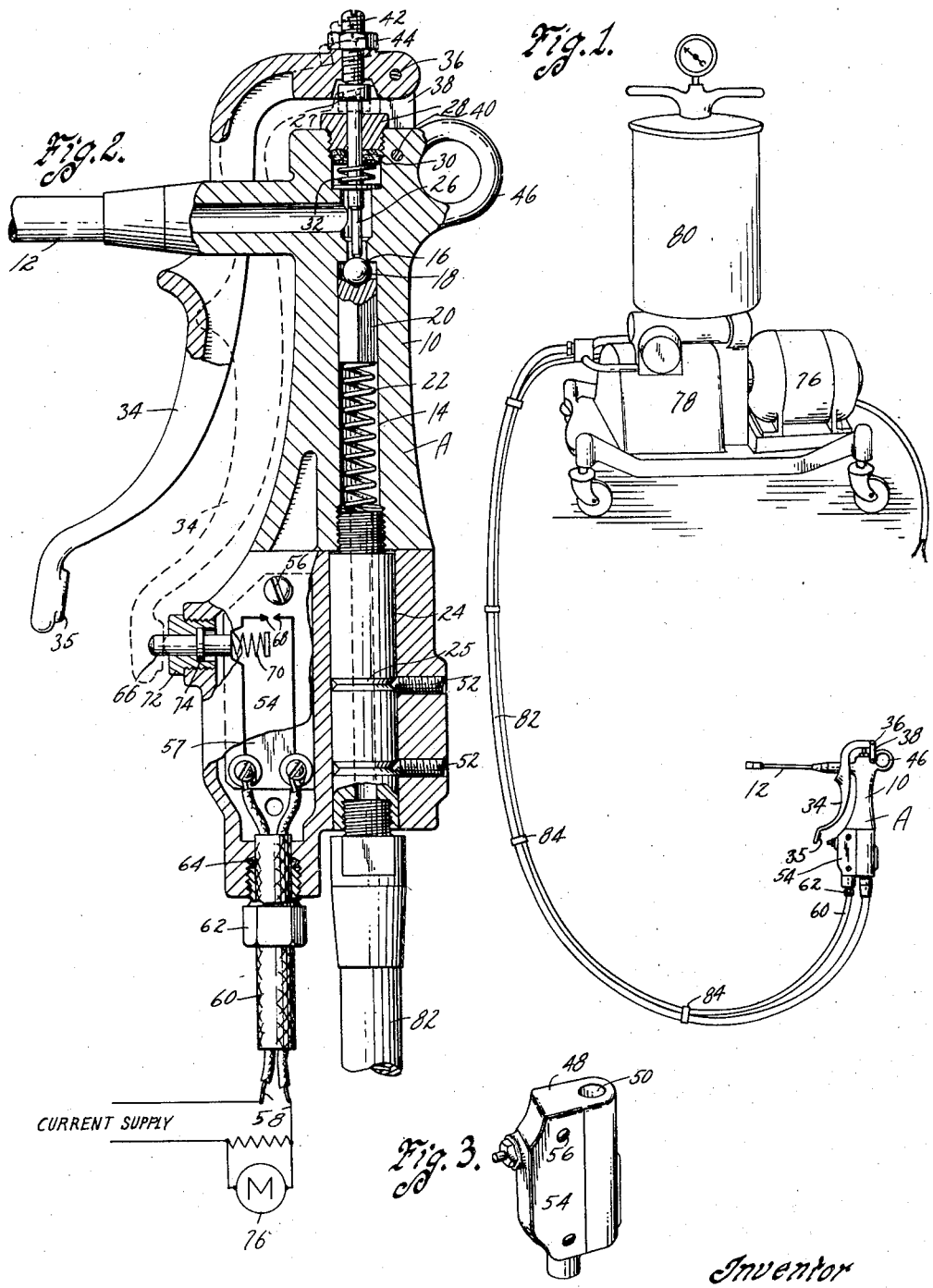

1,953,393

UNITED STATES PATENT OFFICE 1,953,393

LUBRICANT NOZZLE AND CONTROL

John F. Carter, Bryan, Ohio, assignor to The Aro Equipment Corporation, Bryan, Ohio, a corporation of Ohio Application May 23, 1932, Serial No. 613,010

3 Claims. (Cl. 221—47.1)

One object of my present invention is to provide a lubricant nozzle and a control associated therewith for controlling the flow of lubricant through the nozzle and for controlling the energization of electric means for causing such flow, the device being comparatively simple and inexpensive to manufacture.

A further object is to provide a lubricant nozzle having a valve therein and a control handle for the valve which also engages a switch to move it to closed circuit position when the valve is opened so that electric means for causing the flow of lubricant through the valve may be energized when and only when the valve is opened.

A further object is to provide a nozzle having a sleeve extending therefrom through which the lubricant is introduced to the nozzle and a switch within a switch casing, the casing having a bore to receive the sleeve, set screw means being provided to retain the switch casing in proper position with respect to the nozzle.

Still another object is to provide a slidable pin for actuating the switch to closed circuit position when depressed, with the control handle for the valve engaging the pin to depress it.

Still another object is to provide means for spring extending the pin and a shoulder which contacts with the inner wall of the switch casing when so extended to prevent the entrance of lubricant into the switch casing around the pin.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a perspective view of a lubricating apparatus with a lubricant nozzle and control embodying my invention connected therewith.

Figure 2 is an enlarged view of the lubricant nozzle and control partly in section; and Figure 3 is a perspective view of the switch casing and switch detached from the lubricant nozzle.

On the accompanying drawing, I have used the reference character A to indicate generally my lubricant nozzle and control. The nozzle portion thereof comprises a body 10 and a discharge nozzle portion 12. Within the body 10, a bore 14 terminates in a valve seat 16. A ball valve 18 is normally retained against the seat 16 by a follower 20 and a spring 22. The spring 22 is interposed between the follower 20 and a sleeve 24 which forms an extension of the body 10. The sleeve 24 is illustrated as being screw-threadedly associated with the body 10, but may be integral therewith if desired.

A valve stem 26 is provided for depressing the valve 18 and is slidable through a nut 28. Packing 30 surrounds the stem 26 to prevent leakage of lubricant therearound. A spring 32 retains the packing 30 tight.

A control handle 34 is pivoted at 36 to a pair of links 38. The links 38 are pivoted at 40 to the body portion 10 of the nozzle.

A set screw 42 is threaded relative to the control handle 34 and is adapted to engage a head 27 of the valve stem 26. A lock nut 44 is provided for retaining the set screw 42 in adjusted position.

On the body 10, an eye 46 is provided for hanging the nozzle on a hook or the like when it is not in use.

In connection with the lubricant nozzle, I provide a switch casing 48 having a bore 50. The bore 50 is adapted to receive the sleeve 24. The switch casing 48 is retained against rotational and slidable movement relative to the sleeve 24 by set screws 52 which enter grooves 25 of the sleeve 24.

A cover plate 54 is provided for the switch casing 48. Screws 56 retain the cover plate in position.

Within the switch casing 48 I provide a switch 57 to which electric leads 58 extend. The leads 58 are encased in a flexible conduit 60 which extends through a packing nut 62 and packing 64. The packing 64 is provided to prevent the entrance of lubricant into the switch casing 48 around the conduit 60.

The switch 57 includes a pin 66 which when depressed causes engagement of contacts 68 with each other for closing an electric circuit through the wires 58. The contacts 68 are normally spaced from each other by a spring 70 which also extends the pin 66.

The pin 66 is slidable through a nut 72 and is provided with a shoulder 74. Under the action of the spring 70, the shoulder 74 engages the nut 72 to normally prevent entrance of lubricant into the switch casing 48 around the pin 66.

It will be noted that the control handle 34 is so located that a boss 35 thereof will engage the pin 66 after the valve 18 is opened and depress the pin for engaging the contacts 68 with each other. This position is shown by dotted lines in Figure 2.

In Figure 2 I have shown the wires 58 diagrammatically connected with a motor 76. In Figure 1 I have shown a lubricating apparatus in which the motor 76 operates a lubricant pump 78 for pumping lubricant from a reservoir 80 to a flexible hose 82. The flexible hose 82 extends to the sleeve 24 for delivering lubricant under pressure thereto and finally to the lubricant nozzle. The flexible conduit 60, it will be noted, extends alongside the hose 82 and is clipped thereto by spaced clips 84.

The switch 57 being connected with the motor 76 will cause it to be energized whenever the valve 18 is opened for pumping lubricant through the valve and from the discharge nozzle 12. Whenever the valve is closed, the motor 76 will be de-energized and accordingly the pumping operation will cease.

I have provided a simple means for mounting the switch relative to the nozzle in position for actuation from the control handle thereof. The switch is easily renewable and at any time can be readily detached from the nozzle if desired.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a device of the class described, a lubricant nozzle, movable means thereon for controlling the flow of lubricant therethrough, a switch casing mounted on said nozzle, a switch in said switch casing and a pin slidable through a wall of said switch casing and associated with the switch therein to move it to closed circuit position when said pin is depressed, said movable means being engageable with said pin to depress it when said movable means moves to position for permitting lubricant to flow through said nozzle, said pin being spring extended and having a shoulder engaging the inside of said switch casing under the action of said spring to prevent the entrance of lubricant into said switch casing around said pin.

2. In a device of the class described, a lubricant nozzle, movable means thereon for controlling the flow of lubricant therethrough, a switch casing mounted on said nozzle, a switch in said switch casing and a pin slidable through a wall of said switch casing, and associated with the switch therein to move it to closed circuit position when said pin is depressed, said movable means being engageable with said pin to depress it when said movable means is moved to position for permitting lubricant to flow through said nozzle, said pin being spring extended and having a shoulder engaging the inside of said switch casing under the action of said spring to prevent the entrance of lubricant into said switch casing around said pin, said switch casing having a cylinder-like socket to receive said shoulder whereby said shoulder acts as a piston therein to force grease in said socket out of said switch casing through the space between said pin and the wall of the switch casing.

3. In a device of the class described, a lubricant nozzle, movable means thereon for controlling the flow of lubricant therethrough, a sleeve having one end screw threaded into said lubricant nozzle, a lubricant supply hose screwed into the other end of said sleeve, a switch casing having a bore receiving said sleeve, said sleeve having an annular groove, a set screw in said switch casing for setting in said groove, said sleeve constituting the sole means for supporting said switch casing relative to said lubricant nozzle, a switch within said casing and means extending through the wall of said casing and engaged by said movable means to operate said switch when the movable means is moved to operative position.

JOHN F. CARTER.